United States Patent
Xia et al.

(10) Patent No.: US 10,977,079 B2
(45) Date of Patent: Apr. 13, 2021

(54) METHOD AND APPARATUS FOR IMPLEMENTING ACCELERATION PROCESSING ON VNF

(71) Applicant: Huawei Technologies Co., Ltd., Shenzhen (CN)

(72) Inventors: Jinwei Xia, Nanjing (CN); Xinyu Hu, Nanjing (CN); Liang Zhang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 904 days.

(21) Appl. No.: 15/277,926

(22) Filed: Sep. 27, 2016

(65) Prior Publication Data

US 2017/0039089 A1  Feb. 9, 2017

Related U.S. Application Data

(63) Continuation of application No. PCT/CN2015/073792, filed on Mar. 6, 2015.

(30) Foreign Application Priority Data

Mar. 28, 2014 (CN) .......................... 201410124139.7
Aug. 30, 2014 (CN) .......................... 201410438520.0

(51) Int. Cl.
*G06F 9/50* (2006.01)
*G06F 9/54* (2006.01)
*G06F 9/455* (2018.01)

(52) U.S. Cl.
CPC ............ *G06F 9/5005* (2013.01); *G06F 9/455* (2013.01); *G06F 9/4555* (2013.01);
(Continued)

(58) Field of Classification Search
CPC ...... G06F 9/455; G06F 9/5005; G06F 9/5044; G06F 9/544
See application file for complete search history.

(56) References Cited

U.S. PATENT DOCUMENTS 7,502,884 B1  3/2009 Shah et al.
8,145,894 B1  3/2012 Casselman
(Continued)

FOREIGN PATENT DOCUMENTS

CN  102227718 A  10/2011
CN  103270492 A  8/2013

OTHER PUBLICATIONS

ETSI Group Specification, ETSI GS NFV 001 V1.1.1 1-14 Network Functions Virtualisation (NFV); Use Cases, XP055143758, Oct. 2013, 50 pages.
(Continued)

*Primary Examiner* — Jorge A Chu Joy-Davila
(74) *Attorney, Agent, or Firm* — Slater Matsil, LLP

(57) ABSTRACT

The present invention discloses a method and an apparatus for implementing acceleration processing on a VNF. In the present invention, an acceleration request of performing acceleration processing on a virtualized network function VNF is received; a hardware acceleration device capable of performing acceleration processing on the VNF is determined according to the acceleration request; and an acceleration resource of the hardware acceleration device is allocated to the VNF, so as to perform acceleration processing on the VNF. According to the present invention, a corresponding hardware acceleration device can be dynamically selected for and allocated to a VNF, implementing virtualized management on the hardware acceleration device, and improving resource utilization.

21 Claims, 6 Drawing Sheets

(52) U.S. Cl.
CPC ............ *G06F 9/5044* (2013.01); *G06F 9/544* (2013.01); *G06F 2009/45595* (2013.01)

(56) References Cited

U.S. PATENT DOCUMENTS

| | | | |
|---|---|---|---|
| 9,430,262 | B1* | 8/2016 | Felstaine ............. G06F 9/45558 |
| 2010/0131669 | A1 | 5/2010 | Srinivas et al. |
| 2012/0154389 | A1 | 6/2012 | Bohan et al. |
| 2013/0151646 | A1 | 6/2013 | Chidambaram et al. |
| 2013/0152075 | A1 | 6/2013 | Cardona et al. |
| 2014/0201374 | A1* | 7/2014 | Ashwood-Smith ..... H04L 49/70 709/226 |
| 2014/0317293 | A1* | 10/2014 | Shatzkamer ........ G06F 9/45558 709/226 |
| 2016/0277292 | A1 | 9/2016 | Hu et al. |

OTHER PUBLICATIONS

ETSI GS NFV 002, V1.1.1, Group Specification, "Network Functions Virtualisation (NFV), Architectural Framework," XP55292127, Oct. 2013, 21 pages.

Sabater, Susana Sabater: ETSI GS NFV 004, V1.1.1, Group Specification, Network Functions Virtualisation (NFV); Virtualisation Requirements, Technical Fields Requirements, Searched, XP055344052, Oct. 1, 2013, 17 pages.

Jain, Raj, "Introduction to Network Function Virtualization (NFV)," XP055344045, Dec. 20, 2013, 28 pages.

AT&T, et al., Network Functions Virtualisation—Update White Paper, "Network Functions Virtualisation (NFV)," "Network Operation Perspectives on Industry Progress," Contributing Organisations and Authors Contents, XP055156132, Oct. 17, 2013, 16 Pages.

Digiglio, John, et al., Intel, Wind River, "High Performance, Open Standard Virtualization with NFV and SDN, A Joint Hardware and Software Platform for Next-Generation NFV and SDN Deployments11," XP055298534, Jan. 1, 2013, 14 pages.

* cited by examiner

METHOD AND APPARATUS FOR IMPLEMENTING ACCELERATION PROCESSING ON VNF

CROSS-REFERENCE TO RELATED APPLICATIONS

This application is a continuation of International Application No. PCT/CN2015/073792, filed on Mar. 6, 2015, which claims priority to Chinese Patent Application No. 201410124139.7, filed on Mar. 28, 2014, and Chinese Patent Application No. 201410438520.0, filed on Aug. 30, 2014. All of the aforementioned patent applications are hereby incorporated by reference in their entireties.

TECHNICAL FIELD

The present invention relates to the field of network technologies, and in particular, to a method and an apparatus for implementing acceleration processing on a virtualized network function (VNF).

BACKGROUND

In the network function virtualization (NFV) technology, dedicated network element devices in a communications network are replaced with an x86 server, a storage device, and a switching device that are based on the industry standards, which can save investment costs for an operator and help the operator obtain more network capabilities that are more flexible. Therefore, the NFV technology has a wider range of applications.

FIG. 1 is an architectural diagram of an NFV system 100. As can be known from FIG. 1, a VNF runs on the NFV system in a software form. A network function virtualization infrastructure (NFVI) virtualizes, by using a virtualization technology, hardware devices such as a Computer (a processing device), a Storage (a storage device), and a Network (a network interface) as abstract resource information, that is, virtualized resources. The VNF may invoke the virtualized resource obtained by means of virtualization, and does not need to sense underlying hardware information, thereby implementing operations such as online maintenance and online upgrading on a hardware device. A virtualized network function manager (VNFM), an Orchestrator (a management platform), and a virtualized Infrastructure Manager (VIM) that are in network function virtualization management (NFVM) can centrally invoke and manage hardware resources and virtualized resources.

Currently, for some VNFs that consume more hardware resources, for example, a network device with a particular network processor, a traditional network processor has a strong processing capability. However, a standard x86 server usually cannot satisfy a resource requirement of the VNFs that consume more hardware resources, which affects normal operation of the VNFs, and cannot satisfy actual applications.

To ensure normal operation of a VNF that consumes more hardware resources, a hardware accelerator is usually used to perform acceleration processing on the VNF. Generally, a card insertion manner is used, where an accelerator card is inserted into a port of an x86 server to perform acceleration processing on a data packet. The accelerator card performs corresponding processing on the data packet according to a set function such as WAN acceleration, encryption, or compression. The accelerator card is similar to a network interface card, is easy to use, and has good acceleration performance. However, the accelerator card can be used by only one X86 server, and cannot be shared by multiple X86 servers.

An objective of NFV is to implement virtualization of different hardware by using the virtualization technology, so as to implement non-customized solutions for multiple vendors. Similarly, for various physical hardware acceleration devices, if acceleration processing is performed in the current card insertion manner, an inserted physical hardware acceleration device can be used to perform acceleration processing on the VNF only, while various physical hardware acceleration devices cannot be virtualized when acceleration processing is performed on the VNF. The resource utilization is low.

SUMMARY

Embodiments of the present invention provide a method and an apparatus for implementing acceleration processing on a VNF, to implement acceleration processing on the VNF and improve resource utilization.

According to a first aspect, a method for implementing acceleration processing on a VNF is provided, including receiving an acceleration request of performing acceleration processing on a VNF. According to the acceleration request, a hardware acceleration device is determined that is capable of performing acceleration processing on the VNF. An acceleration resource of the hardware acceleration device is allocated to the VNF.

With reference to the first aspect, in a first implementation manner, the receiving an acceleration request of performing acceleration processing on a VNF specifically includes: receiving an acceleration request carrying a service type of a service processed by the VNF and acceleration resource information needed by the VNF; and the determining, according to the acceleration request, a hardware acceleration device capable of performing acceleration processing on the VNF includes: determining, according to the service type, carried in the acceleration request, of the service processed by the VNF, a hardware acceleration device type for performing acceleration processing on the VNF; and determining, according to the acceleration resource information that is needed by the VNF and that is carried in the acceleration request, the hardware acceleration device capable of performing acceleration processing on the VNF among hardware acceleration devices conforming to the determined hardware acceleration device type.

With reference to the first aspect or the first implementation manner of the first aspect, in a second implementation manner, the determining, according to the acceleration request, a hardware acceleration device capable of performing acceleration processing on the VNF specifically includes: determining, according to the service type, carried in the acceleration request, of the service processed by the VNF, the hardware acceleration device type for performing acceleration processing on the VNF, where for example, the service type is a computation-intensive service, and the determined hardware acceleration device type is an FPGA; determining, according to the acceleration resource information that is needed by the VNF and that is carried in the acceleration request, an acceleration resource needed for the determined hardware acceleration device type, where for example, if the acceleration resource needed by the VNF is a throughput of 2 Gbps, it is obtained through computation that a resource description on an FPGA hardware acceleration platform is: LUT 200 K to 250 K, and BRAM 480 K to 500 KB; and determining, according to hardware resource information of different hardware acceleration devices, a hardware acceleration device that can satisfy the acceleration resource needed for the determined hardware acceleration device type, as the hardware acceleration device capable of performing acceleration processing on the VNF.

With reference to the first implementation manner of the first aspect or the second implementation manner of the first aspect, in a third implementation manner, the determining, according to the acceleration resource information that is needed by the VNF and that is carried in the acceleration request, the hardware acceleration device capable of performing acceleration processing on the VNF specifically includes: querying a service resource level correspondence table according to the determined hardware acceleration device type, where acceleration resources needed for mapping the acceleration resource information that is needed by the VNF onto different hardware acceleration devices are recorded in the service resource level correspondence table; determining, according to a query result, acceleration resources needed for mapping the acceleration resource information that is needed by the VNF and that is carried in the acceleration request onto different hardware acceleration devices of the determined hardware acceleration device type; and determining, according to hardware resource information that is stored in a hardware resource information table and that separately corresponds to different hardware acceleration devices, a hardware acceleration device that can satisfy the determined acceleration resources needed for the mapping onto the hardware acceleration devices, as the hardware acceleration device capable of performing acceleration processing on the VNF.

With reference to the third implementation manner of the first aspect, in a fourth implementation manner, the determining, according to hardware resource information that is stored in a hardware resource information table and that separately corresponds to different hardware acceleration devices, the hardware acceleration device satisfies the determined acceleration resources needed for the mapping onto the hardware acceleration devices includes: determining, according to at least one type of the following hardware resource information that is stored in the hardware resource information table and that separately corresponds to different hardware acceleration devices: resource utilization, location information, or access manners, the hardware acceleration device that can satisfy the determined acceleration resources needed for the mapping onto the hardware acceleration devices.

With reference to the first aspect or any one of the first to the fourth implementation manners of the first aspect, in a fifth implementation manner, the allocating an acceleration resource of the hardware acceleration device to the VNF includes: adding attribute information of the hardware acceleration device to response information that is in response to the acceleration request, so that a VNFM and/or a management platform Orchestrator directs, according to the attribute information, service processing of the VNF to the hardware acceleration device corresponding to the attribute information, and the hardware acceleration device performs acceleration processing on the VNF.

According to a second aspect, an apparatus for implementing acceleration processing on a VNF is provided, including a receiving unit, a determining unit, and an allocation unit. The receiving unit is configured to receive an acceleration request of performing acceleration processing on a VNF. The determining unit is configured to determine, according to the acceleration request, a hardware acceleration device capable of performing acceleration processing on the VNF. The allocation unit is configured to allocate an acceleration resource of the hardware acceleration device to the VNF, so as to implement performing acceleration processing on the VNF.

With reference to the second aspect, in a first implementation manner, the receiving unit is specifically configured to: receive an acceleration request carrying a service type of a service processed by the VNF and acceleration resource information needed by the VNF. The determining unit is specifically configured to: determine, according to the service type, carried in the acceleration request, of the service processed by the VNF, a hardware acceleration device type for performing acceleration processing on the VNF; and determine, according to the acceleration resource information that is needed by the VNF and that is carried in the acceleration request, the hardware acceleration device capable of performing acceleration processing on the VNF among hardware acceleration devices conforming to the determined hardware acceleration device type.

With reference to the second aspect or the first implementation manner of the second aspect, in a second implementation manner, the determining unit is configured to: determine, according to the service type, carried in the acceleration request, of the service processed by the VNF, the hardware acceleration device type for performing acceleration processing on the VNF; determine, according to the acceleration resource information that is needed by the VNF and that is carried in the acceleration request, an acceleration resource needed for the determined hardware acceleration device type; and determine, according to hardware resource information of different hardware acceleration devices, a hardware acceleration device that can satisfy the acceleration resource needed for the determined hardware acceleration device type, as the hardware acceleration device capable of performing acceleration processing on the VNF.

With reference to the first implementation manner or the second implementation manner of the second aspect, in a third implementation manner, the determining unit is specifically configured to query a service resource level correspondence table according to the determined hardware acceleration device type, where acceleration resources needed for mapping the acceleration resource information that is needed by the VNF onto different hardware acceleration devices are recorded in the service resource level correspondence table; determine, according to a query result, acceleration resources needed for mapping the acceleration resource information that is needed by the VNF and that is carried in the acceleration request onto different hardware acceleration devices of the determined hardware acceleration device type; and determine, according to hardware resource information that is stored in a hardware resource information table and that separately corresponds to different hardware acceleration devices, a hardware acceleration device that can satisfy the determined acceleration resources needed for the mapping onto the hardware acceleration devices, as the hardware acceleration device capable of performing acceleration processing on the VNF.

With reference to the third implementation manner of the second aspect, in a fourth implementation manner, the determining unit is specifically configured to: determine, according to at least one type of the following hardware resource information that is stored in the hardware resource information table and that separately corresponds to different hardware acceleration devices: resource utilization, location information, or access manners, the hardware acceleration device that can satisfy the determined acceleration resources needed for the mapping onto the hardware acceleration devices.

With reference to the second aspect or any one of the first to fourth implementation manners of the second aspect, in a fifth implementation manner, the allocation unit is specifically configured to: add attribute information of the hardware acceleration device to response information that is in response to the acceleration request, so that a VNFM and/or a management platform Orchestrator directs, according to the attribute information, service processing of the VNF to the hardware acceleration device corresponding to the attribute information, and the hardware acceleration device performs acceleration processing on the VNF.

According to the method and the apparatus for implementing acceleration processing on a VNF that are provided in the embodiments of the present invention, when an acceleration request of needing to perform acceleration processing on a VNF is received, a hardware acceleration device capable of performing acceleration processing on the VNF is determined according to the acceleration request; and an acceleration resource of the determined hardware acceleration device is allocated to the VNF, so as to implement acceleration processing on the VNF. According to the present invention, an acceleration resource of a hardware acceleration device can be determined and allocated to a VNF according to an acceleration request, and the corresponding hardware acceleration device can be dynamically selected for and allocated to the VNF, implementing virtualized management on the hardware acceleration device, and improving resource utilization.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
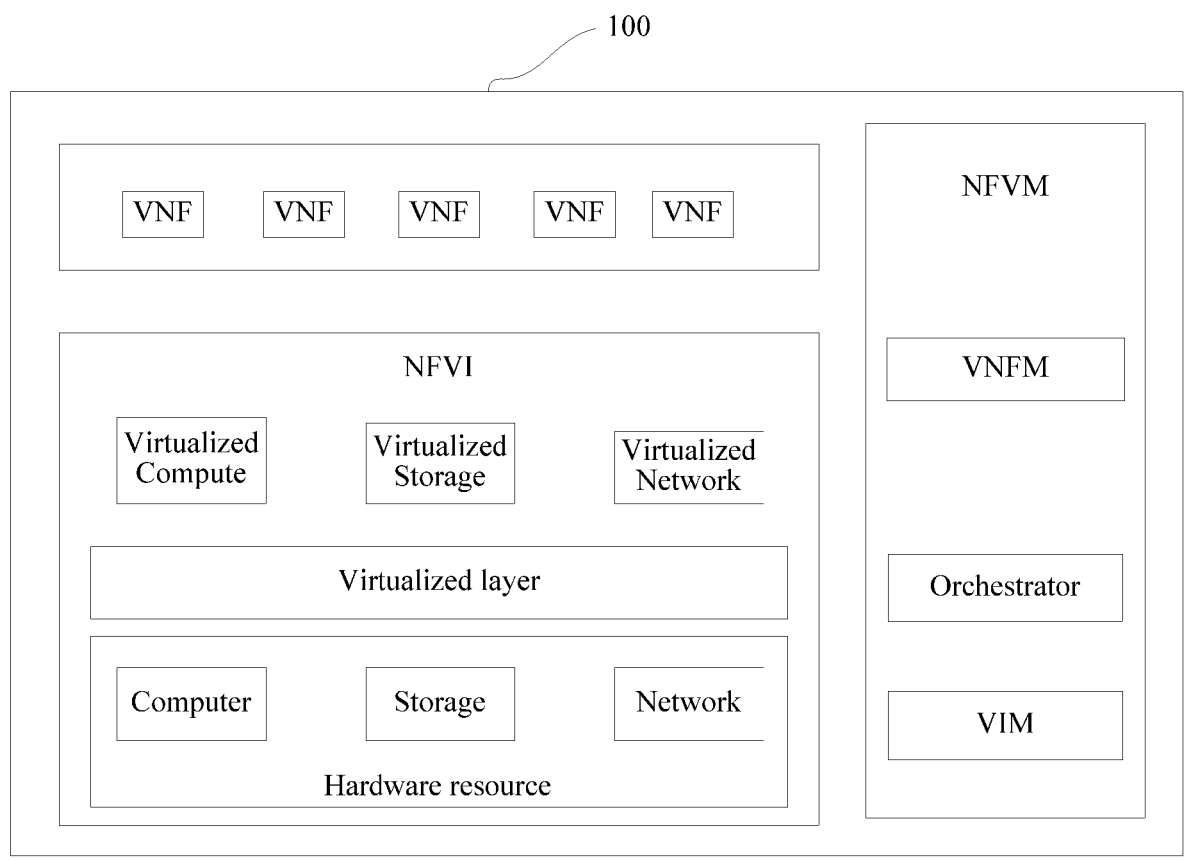
FIG. 1 is an architectural diagram of an NFV system in the prior art.
Figure 2:
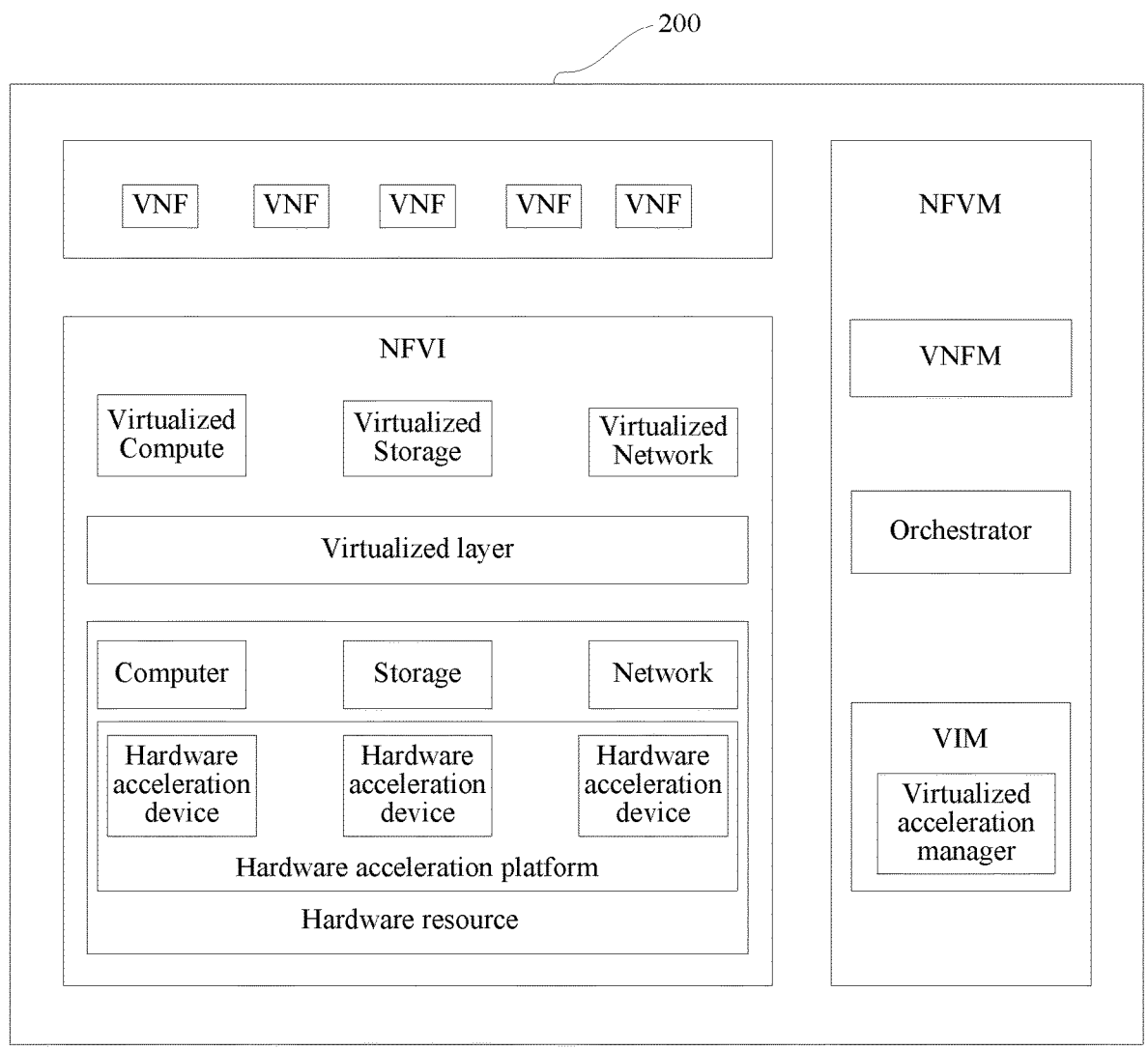
FIG. 2 is a diagram of a system architecture for implementing acceleration processing on a VNF according to an embodiment of the present invention.

A system architecture 200 shown in FIG. 2 may be applied to a method for implementing acceleration processing on a VNF according to an embodiment of the present invention. In FIG. 2, a hardware acceleration platform is a combination set of multiple hardware acceleration devices. In FIG. 2, a hardware acceleration device may be an application-specific integrated circuit (ASIC), a network processor (NP), a field programmable gate array (FPGA), or the like. The hardware acceleration platform can periodically report hardware resource information of each hardware acceleration device to a virtualized acceleration manager. The virtualized acceleration manager can receive hardware resource information of different hardware acceleration devices reported by the hardware acceleration platform. The virtualized acceleration manager can further receive an acceleration request, sent by a VNFM, an Orchestrator, and/or the like, of performing acceleration processing on the VNF, determine, according to the acceleration request, a hardware acceleration device conforming to a requirement, and allocate an acceleration resource of the hardware acceleration device to the VNF, so as to implement acceleration processing on the VNF.

It should be noted that, in the diagram of the architecture system shown in FIG. 2 in this embodiment of the present invention, implementing a function of the virtualized acceleration manager inside a VIM is merely used for an exemplary description, and is not used for limitation. The virtualized acceleration manager in this embodiment of the present invention may also be an independent function module.

Figure 3:
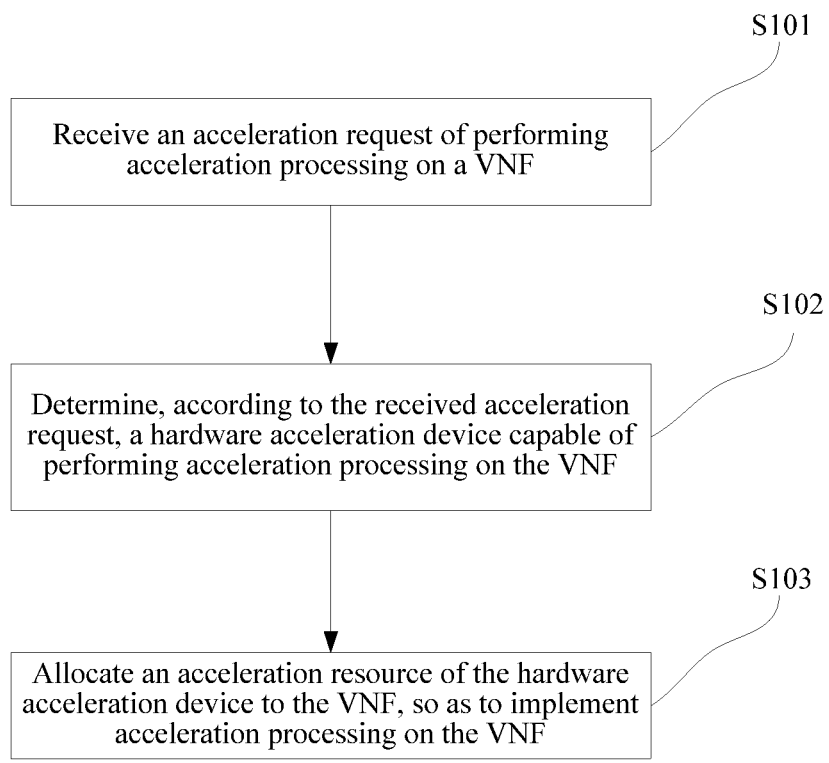
FIG. 3 is a flowchart of a method for implementing acceleration processing on a VNF according to an embodiment of the present invention.

FIG. 3 is a flowchart of a method for implementing acceleration processing on a VNF according to an embodiment of the present invention, including:

S101: Receive an acceleration request of performing acceleration processing on a VNF.

S102: Determine, according to the received acceleration request, a hardware acceleration device capable of performing acceleration processing on the VNF.

S103: Allocate an acceleration resource of the hardware acceleration device to the VNF, so as to implement acceleration processing on the VNF.

According to the method for implementing acceleration processing on a VNF provided in this embodiment of the present invention, when an acceleration request of needing to perform acceleration processing on a VNF is received, a hardware acceleration device capable of performing acceleration processing on the VNF is determined according to the acceleration request; and an acceleration resource of the determined hardware acceleration device is allocated to the VNF, so as to implement acceleration processing on the VNF. According to the present invention, an acceleration resource of a hardware acceleration device can be determined and allocated to a VNF according to an acceleration request, and the corresponding hardware acceleration device can be dynamically selected for and allocated to the VNF, implementing virtualized management on the hardware acceleration device, and improving resource utilization.

Preferably, the virtualized acceleration manager in this embodiment of the present invention may generate a hardware resource information table according to received hardware resource information of different hardware acceleration devices reported by a hardware acceleration platform. The hardware resource information table stores the hardware resource information of the different hardware acceleration devices. In this embodiment of the present invention, the hardware resource information table is used to collect statistics about the hardware resource information of different hardware acceleration devices, for example, FPGA: model, LUT, BRAM, DSP Slices, and information about a PR (Partial Reconfiguration) table if the FPGA supports PR;

NPU: model, Core, frequency, L3 Cache, and SDRAM; and

ASIC: model, function, Throughput, and RAM.

The hardware resource information table in this embodiment of the present invention is a table set recording different hardware acceleration devices, and is managed and controlled by the virtualized acceleration manager. Table 1 is a hardware resource information table described by using an example in which the hardware acceleration platform is an FPGA.

TABLE 1

| ID | Model | Idle | Total quantity | Proportion |
|---|---|---|---|---|
| 001 | Virtex-7 | LUT: 1800K | LUT: 1955K | LUT: 92.1% |
|  |  | BRAM: 60 MB | BRAM: 68 MB | BRAM: 88.2% |
| 002 | Altix-7 | LUT: 200K | LUT: 215K | LUT: 66.6% |
|  |  | BRAM: 10 MB | BRAM: 13 MB | BRAM: 76.9% |
| 003 | StratixIV | LUT: 1300K | LUT: 1800 K | LUT: 72.2% |
|  |  | BRAM: 42 MB | BRAM: 60 MB | BRAM: 62.8% |

In Table 1, only information about LUT and BRAM is listed, and certainly, the table may be extended to include more information. For example, if a PR (Partial Reconfiguration) partition technology is used to divide one FPGA into multiple isolated partitions, during selection of the hardware acceleration device, parameter information in a PR table is further considered. For example, two information parameters are considered: a $DDR_3$ bandwidth and size. The $DDR_3$ bandwidth and size are hardware restrictions allocated by the FPGA to the PR. By using implementation of a redundancy removal function (Dedup) as an example, when a PR partition is invoked, a large quantity of PR entries needs to be accessed. Therefore, DDR restrictions and a quantity of LUTs of the PR need to be considered to select an optimal hardware device.

Certainly, in this embodiment of the present invention, in addition to the foregoing information, other hardware resource information including location information, an access manner, and the like of the hardware acceleration device may further be recorded in the hardware resource information table. A hardware acceleration device closest to a location of the VNF may be selected according to the recorded location information, and a hardware acceleration device with a same access manner is selected according to the access manner.

Further, in this embodiment of the present invention, the determining a hardware acceleration device capable of performing acceleration processing on the VNF in S102 may be: querying the foregoing hardware resource information table, and determining, according to the hardware resource information that is stored in the hardware resource information table and that separately corresponds to different hardware acceleration devices, a hardware acceleration device capable of providing acceleration processing for the VNF as the hardware acceleration device capable of performing acceleration processing on the VNF.

Preferably, in this embodiment of the present invention, each VNF in an NFV system may be invoked by using a VNFM and/or an Orchestrator in the NFV system, a VNF or a sub-VNF supporting acceleration is determined according to a function implemented by each VNF, and an acceleration resource needed by the VNF or the sub-VNF is computed. For example, a VNF implementing an NAT service needs a throughput of 2 Gbps. In this embodiment of the present invention, the acceleration request may be sent to the virtualized acceleration manager by using the VNFM and/or the Orchestrator, where the acceleration request carries that a service type of a service processed by the VNF is the NAT service, and that the needed acceleration resource is the throughput of 2 Gbps.

Further, in this embodiment of the present invention, the virtualized acceleration manager may select a proper hardware acceleration device according to the service type, carried in the acceleration request, of the service processed by the VNF and the needed acceleration resource.

Specifically, in this embodiment of the present invention, a type of the hardware acceleration device that can provide the acceleration resource to the service processed by the VNF and that can perform acceleration processing on the VNF may be determined according to the service type of the service processed by the VNF. For example, when the service type is a computation-intensive service (Crypto, Dedup, or DPI), an FPGA may be selected; when the service type is a data-intensive service (L3 Forwarding or NAT Forwarding), an NPU may be selected; an ASIC may be selected for a particular service having an extremely high requirement on performance (L2 Forwarding).

In this embodiment of the present invention, after the hardware acceleration device type for performing acceleration processing on the VNF is determined, among hardware acceleration devices conforming to the determined hardware acceleration device type, the hardware acceleration device capable of performing acceleration processing on the VNF is determined according to the acceleration resource needed by the VNF and according to acceleration resource information that is needed by the VNF and that is carried in the acceleration request. In this embodiment of the present invention, the virtualized acceleration manager may pre-store a service resource level correspondence table, where acceleration resources needed for mapping the acceleration resource information that is needed by the VNF onto different hardware acceleration devices are recorded in the service resource level correspondence table, and the acceleration resources recorded in the service resource level correspondence table are expressed in a fixed resource description manner on different hardware acceleration devices. For example, as shown in Table 2, Table 2 is described by using FPGAs as an example.

TABLE 2

| Service | Virtex-7 | Altix-7 | StratixIV |
|---|---|---|---|
| NAT Low | LUT: 2000K | LUT: 2200K | LUT: 2300K |
|  | BRAM: 200K | BRAM: 200K | BRAM: 220K |
| NAT Middle | LUT: 2000K | LUT: 2200K | LUT: 2300K |
|  | BRAM: 220K | BRAM: 230K | BRAM: 230K |
| NAT High | LUT: 2300K | LUT: 2500K | LUT: 2500K |
|  | BRAM: 300K | BRAM: 300K | BRAM: 320K |
| Dedup | LUT: 20000K | LUT: 24000K | LUT: 25000K |
|  | BRAM: 480K | BRAM: 500K | BRAM: 500K |
| Comp | LUT: 11000K | LUT: 12000K | LUT: 14000K |
|  | BRAM: 350K | BRAM: 350K | BRAM: 370K |
| . . . |  |  |  |

In this embodiment of the present invention, the service resource level correspondence table may be queried according to the determined hardware acceleration device type, and acceleration resources needed for mapping the acceleration resource information that is needed by the VNF and that is carried in the acceleration request onto different hardware acceleration devices of the determined hardware acceleration device type are determined according to a query result. For example, if a acceleration resource needed by the VNF is a throughput of 2 Gbps, a resource description on the FPGA hardware acceleration platform is: LUT 200 K to 250 K, and BRAM 480 K to 500 KB, and in this case, an FPGA whose LUT is greater than 250 K and whose BRAM is greater than 500 KB needs to be selected in the hardware resource information table.

Specifically, services of a same type may require different acceleration resources on hardware acceleration devices from different vendors or of different models. The FPGAs in Table 2 are used as an example. By using a redundancy removal function (Dedup) as an example, three different FPGA hardware acceleration devices can provide different acceleration resources. The virtualized acceleration manager determines, by querying the service resource level correspondence table, corresponding resource descriptions for mapping the acceleration resource needed by the VNF onto different hardware acceleration devices, so as to find a hardware acceleration device capable of providing sufficient acceleration resources. Then, in a case in which performance restrictions of hardware acceleration devices are considered, the virtualized acceleration manager determines, in the hardware resource information table according to the hardware resource information that is stored in the hardware resource information table and that separately corresponds to different hardware acceleration devices, a hardware acceleration device that can satisfy the determined acceleration resources needed for the mapping onto the hardware acceleration devices, as the hardware acceleration device capable of performing acceleration processing on the VNF.

In the present invention, the method for implementing acceleration processing on a VNF in the foregoing embodiment is described in detail in the following with reference to an actual application.

Figure 4:
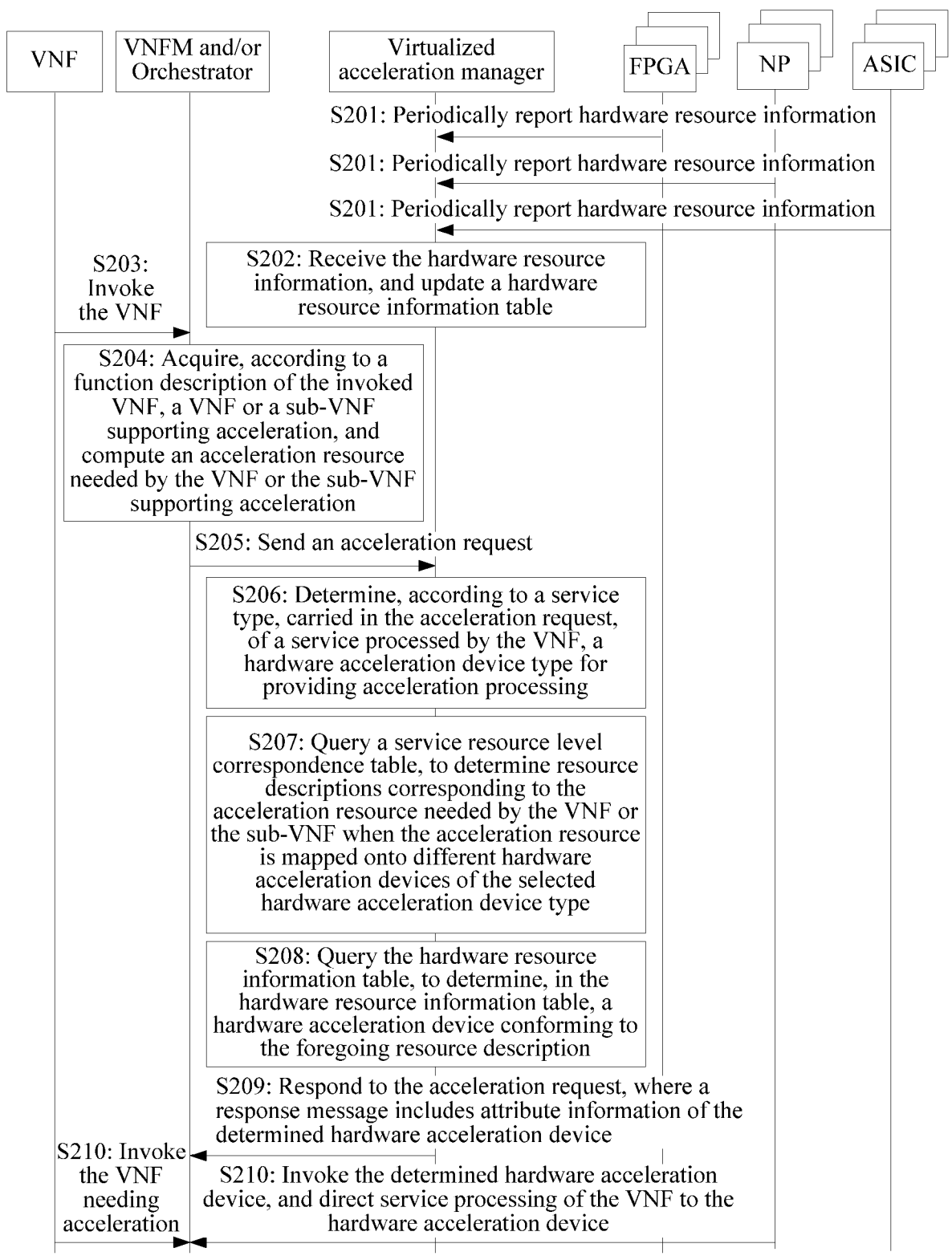
FIG. 4 is a schematic diagram of an implementation process for implementing acceleration processing on a VNF according to an embodiment of the present invention.

FIG. 4 is a schematic diagram of a process for implementing acceleration processing on a VNF according to an embodiment of the present invention, including:

S201: A hardware acceleration platform periodically reports hardware resource information of different hardware acceleration devices (an FPGA, an NP, an ASIC, and the like) to a virtualized acceleration manager, where the reported hardware resource information of the different hardware acceleration devices may also be different, and may generally include resource utilization, location information, access manners, and the like of the hardware acceleration devices.

S202: The virtualized acceleration manager periodically receives the hardware resource information of the hardware acceleration devices reported by the hardware acceleration platform, and updates a hardware resource information table.

S203: A VNFM and/or an Orchestrator invokes a VNF.

S204: The VNFM and/or the Orchestrator acquires, according to a function description of the invoked VNF, a VNF or a sub-VNF supporting acceleration, and computes an acceleration resource needed by the VNF or the sub-VNF supporting acceleration.

S205: The VNFM and/or the Orchestrator sends an acceleration request to the virtualized acceleration manager, where the acceleration request carries a service type of a service processed by the VNF or the sub-VNF and the needed acceleration resource.

S206: The virtualized acceleration manager selects a proper hardware acceleration device type according to the service type, carried in the acceleration request, of the service processed by the VNF. For example: an FPGA may be used for a computation-intensive service: Crypto, Dedup, and DPI. An NPU may be used for a data-intensive service: L3 Forwarding and NAT Forwarding. A ASIC may be used for a particular service having an extremely high requirement on performance: L2 Forwarding.

S207: The virtualized acceleration manager queries a service resource level correspondence table, to determine resource descriptions of the acceleration resource needed by the VNF or the sub-VNF when the acceleration resource is mapped onto different hardware acceleration devices corresponding to the selected hardware acceleration device type. For example, a resource description of a throughput of 2 Gbps when the throughput is mapped onto the FPGA is: LUT 200 K to 250 K and BRAM 480 K to 500 KB.

S208: The virtualized acceleration manager queries the hardware resource information table, and determines, in the hardware resource information table, a hardware acceleration device conforming to the foregoing resource description.

Specifically, in this embodiment of the present invention, a hardware acceleration device that can satisfy the determined acceleration resources needed for the mapping onto the hardware acceleration devices may be determined according to at least one type of the following hardware resource information that is stored in the hardware resource information table and that separately corresponds to different hardware acceleration devices: resource utilization, location information, or access manners. For example, for an FPGA capable of providing acceleration processing for an NAT service, a corresponding resource description in the service resource level correspondence table is 2200 LUT and 200 BRAM; the virtualized acceleration manager queries the hardware resource information table for an FPGA that can satisfy the resource description of 2200 LUT and 200 BRAM. There may be multiple FPGAs satisfying the resource description. In this case, hardware resource information such as the resource utilization, the location information, and the access manner may be considered comprehensively, to select a preferable hardware acceleration device, for example, to select an FPGA that has low resource utilization, that is relatively close to a virtual machine of the NAT, and that has a same access type.

S209: The virtualized acceleration manager responds to the acceleration request sent by the VNFM and/or the Orchestrator, where a response message includes attribute information of the determined hardware acceleration device.

S210: The VNFM and/or the Orchestrator determines, according to the attribute information, carried in the response message, of the hardware acceleration device, to invoke the VNF that needs acceleration and the hardware acceleration device, directs service processing of the VNF to the hardware acceleration device, performs acceleration processing on the VNF, and directs the processing on the VNF to a selected hardware device.

According the method for implementing acceleration processing on a VNF provided in this embodiment of the present invention, when an acceleration request of needing to perform acceleration processing on a VNF is received, a hardware acceleration device capable of performing acceleration processing on the VNF is determined in a pre-stored hardware resource information table according to the acceleration request, and an acceleration resource of the determined hardware acceleration device is allocated to the VNF, so as to implement acceleration processing on the VNF. Because hardware resource information of various hardware acceleration devices of different properties and specifications may be recorded in the pre-stored hardware resource information table, seamless integration of acceleration hardware of different properties and specifications into an NFV system may be implemented by means of the present invention.

Figure 5:
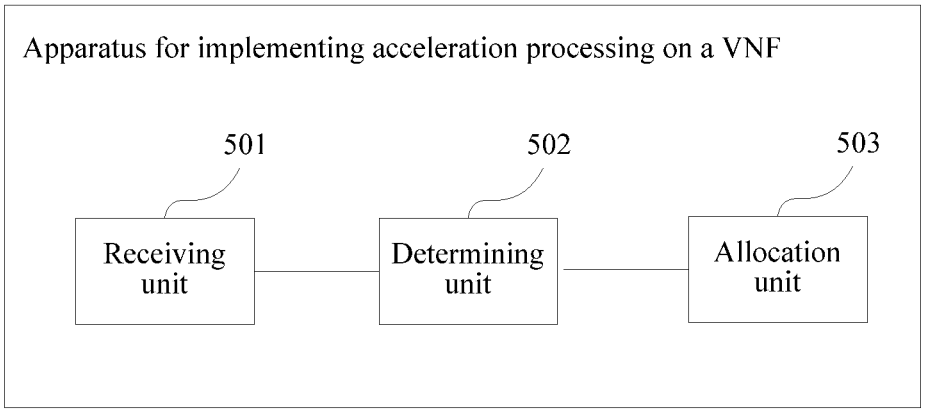
FIG. 5 is a schematic structural diagram of an apparatus for implementing acceleration processing on the VNF according to an embodiment of the present invention.

Based on the method for implementing acceleration processing on a VNF provided above, an embodiment of the present invention further provides an apparatus for implementing acceleration processing on a VNF. As shown in FIG. 5, the apparatus includes: a receiving unit 501, a determining unit 502, and an allocation unit 503. The receiving unit 501 is configured to receive an acceleration request of performing acceleration processing on a virtualized network function VNF. The determining unit 502 is configured to determine, according to the acceleration request, a hardware acceleration device capable of performing acceleration processing on the VNF. The allocation unit 503 is configured to allocate an acceleration resource of the hardware acceleration device to the VNF.

With reference to the apparatus for implementing acceleration processing on a VNF provided above, in a first implementation manner, the receiving unit 501 is configured to: receive an acceleration request carrying a service type of a service processed by the VNF and acceleration resource information needed by the VNF. The determining unit 502 is specifically configured to: determine, according to the service type, carried in the acceleration request, of the service processed by the VNF, a hardware acceleration device type for performing acceleration processing on the VNF; and determine, according to the acceleration resource information that is needed by the VNF and that is carried in the acceleration request, the hardware acceleration device capable of performing acceleration processing on the VNF among hardware acceleration devices conforming to the determined hardware acceleration device type.

With reference to the apparatus for implementing acceleration processing on a VNF provided in the first implementation manner, in a second implementation manner, the determining unit 502 is specifically configured to: query a service resource level correspondence table according to the determined hardware acceleration device type, where acceleration resources needed for mapping the acceleration resource information that is needed by the VNF onto different hardware acceleration devices are recorded in the service resource level correspondence table; determine, according to a query result, acceleration resources needed for mapping the acceleration resource information that is needed by the VNF and that is carried in the acceleration request onto different hardware acceleration devices of the determined hardware acceleration device type; and determine, according to hardware resource information that is stored in a hardware resource information table and that separately corresponds to different hardware acceleration devices, a hardware acceleration device that can satisfy the determined acceleration resources needed for the mapping onto the hardware acceleration devices, as the hardware acceleration device capable of performing acceleration processing on the VNF.

With reference to the apparatus for implementing acceleration processing on a VNF provided in the second implementation manner, in a third implementation manner, the determining unit 502 is specifically configured to: determine, according to at least one type of the following hardware resource information that is stored in the hardware resource information table and that separately corresponds to different hardware acceleration devices: resource utilization, location information, or access manners, the hardware acceleration device that can satisfy the determined acceleration resources needed for the mapping onto the hardware acceleration devices.

With reference to the apparatus for implementing acceleration processing on a VNF provided above, in a fourth implementation manner, the allocation unit 503 is specifically configured to: add attribute information of the hardware acceleration device to response information that is in response to the acceleration request; and invoke the VNF and the hardware acceleration device according to the attribute information, and direct service processing of the VNF to the hardware acceleration device, where the hardware acceleration device performs acceleration processing on the VNF.

Figure 6:
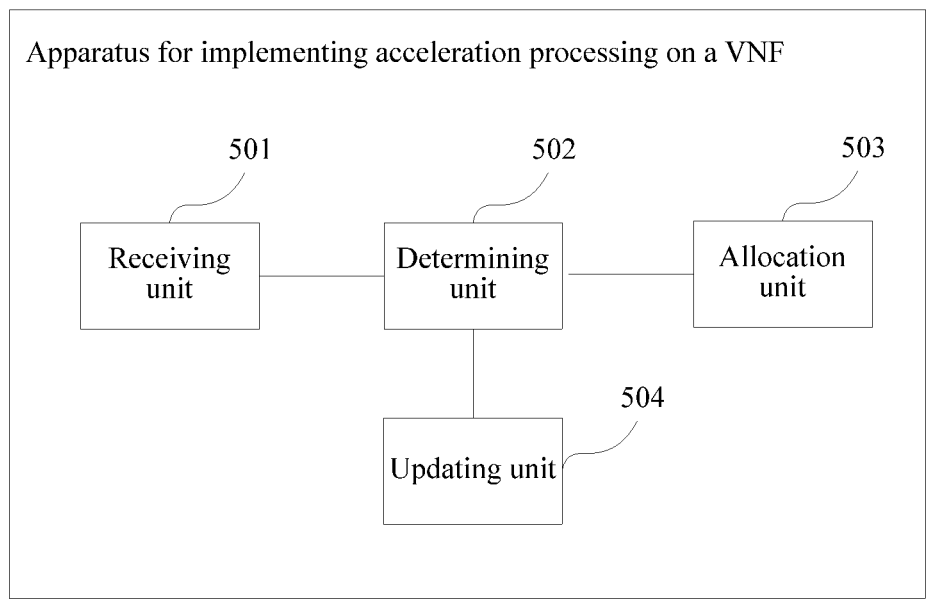
FIG. 6 is another schematic structural diagram of an apparatus for implementing acceleration processing on the VNF according to an embodiment of the present invention.

With reference to the apparatus for implementing acceleration processing on a VNF provided in the second implementation manner or the third implementation manner, in a fifth implementation manner, the apparatus provided in this embodiment of the present invention further includes an updating unit 504, as shown in FIG. 6, where the updating unit 504 is configured to periodically update the hardware resource information table.

According to the apparatus for implementing acceleration processing on a VNF provided in this embodiment of the present invention, when receiving an acceleration request, transferred by a receiving unit, of needing to perform acceleration processing on a VNF, a determining unit determines, according to the acceleration request, a hardware acceleration device capable of performing acceleration processing on the VNF; and an allocation unit allocates an acceleration resource of the determined hardware acceleration device to the VNF, so as to implement acceleration processing on the VNF. According to the present invention, an acceleration resource of a hardware acceleration device can be determined and allocated to a VNF according to an acceleration request, and the corresponding hardware acceleration device can be dynamically selected for and allocated to the VNF, implementing virtualized management on the hardware acceleration device, and improving resource utilization.

Figure 7:
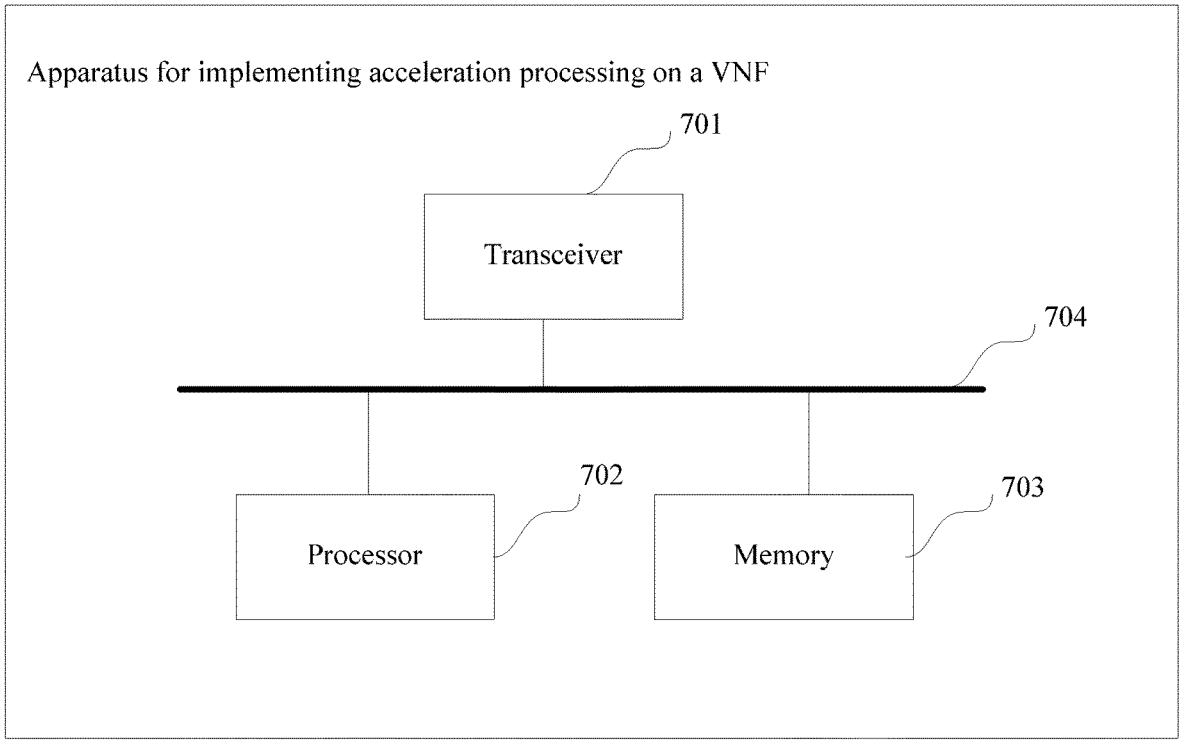
FIG. 7 is another schematic structural diagram of an apparatus for implementing acceleration processing on the VNF according to an embodiment of the present invention.

Based on the apparatus for implementing acceleration processing on a VNF provided in the foregoing embodiment, an embodiment of the present invention further provides a schematic structural diagram of hardware of another apparatus for implementing acceleration processing on a VNF. As shown in FIG. 7, the apparatus includes: a transceiver 701, a processor 702, a memory 703, and a bus 704, where the transceiver 701, the processor 702, and the memory 703 are all connected to the bus 704.

The processor 702 is configured to: receive, by using the transceiver 701, an acceleration request of performing acceleration processing on a virtualized network function VNF, determine, according to the acceleration request, a hardware acceleration device capable of performing acceleration processing on the VNF, and allocate an acceleration resource of the determined hardware acceleration device to the VNF.

The processor 702 is specifically configured to: receive an acceleration request carrying a service type of a service processed by the VNF and acceleration resource information needed by the VNF; determine, according to the service type, carried in the acceleration request, of the service processed by the VNF, a hardware acceleration device type for performing acceleration processing on the VNF; and determine, according to the acceleration resource information that is needed by the VNF and that is carried in the acceleration request, the hardware acceleration device capable of performing acceleration processing on the VNF among hardware acceleration devices conforming to the determined hardware acceleration device type.

Further, the processor 702 is specifically configured to: query a service resource level correspondence table according to the determined hardware acceleration device type, where acceleration resources needed for mapping the acceleration resource information that is needed by the VNF onto different hardware acceleration devices are recorded in the service resource level correspondence table; determine, according to a query result, acceleration resources needed for mapping the acceleration resource information that is needed by the VNF and that is carried in the acceleration request onto different hardware acceleration devices of the determined hardware acceleration device type; and determine, according to hardware resource information that is stored in a hardware resource information table and that separately corresponds to different hardware acceleration devices, a hardware acceleration device that can satisfy the determined acceleration resources needed for the mapping onto the hardware acceleration devices, as the hardware acceleration device capable of performing acceleration processing on the VNF.

Still further, the processor 702 is specifically configured to determine, according to resource utilization, location information, and access manners that are stored in the hardware resource information table and that separately correspond to different hardware acceleration devices, the hardware acceleration device that can satisfy the determined acceleration resources needed for the mapping onto the hardware acceleration devices.

Preferably, the processor 702 is specifically configured to: add attribute information of the hardware acceleration device to response information that is in response to the acceleration request; and invoke the VNF and the hardware acceleration device according to the attribute information, and direct service processing of the VNF to the hardware acceleration device, where the hardware acceleration device performs acceleration processing on the VNF.

Preferably, the processor 702 is further configured to periodically update the hardware resource information table.

The foregoing processes executed by the processor 702 are usually completed under the control of one or more software programs. The foregoing one or more software programs are stored in the memory 703. When the processor 702 needs to execute the foregoing processes, the foregoing one or more software programs are called into the processor 702, and the processor 702 is controlled to complete the foregoing processes. Certainly, the foregoing processes executed by the processor 702 may also be implemented by using hardware, which is not limited in this embodiment of the present invention.

The apparatus for implementing acceleration processing on a VNF provided in this embodiment of the present invention may be used to execute the method for implementing acceleration processing on a VNF shown in FIG. 3 and FIG. 4. Therefore, if descriptions about the apparatus for implementing acceleration processing on a VNF in FIG. 5 to FIG. 7 are not detailed enough in some parts, refer to the descriptions about FIG. 3 and FIG. 4.

It should be noted that the apparatus for implementing acceleration processing on a VNF provided in this embodiment of the present invention may be an independent component, for example, a virtualized acceleration manager, or may be integrated on a virtualized acceleration manager, which is not limited in this embodiment of the present invention.

According to the apparatus for implementing acceleration processing on a VNF provided in this embodiment of the present invention, when an acceleration request of needing to perform acceleration processing on a VNF is received, a hardware acceleration device capable of performing acceleration processing on the VNF is determined according to the acceleration request; and an acceleration resource of the determined hardware acceleration device is allocated to the VNF, so as to implement acceleration processing on the VNF. According to the present invention, an acceleration resource of a hardware acceleration device can be determined and allocated to a VNF according to an acceleration request, and the corresponding hardware acceleration device can be dynamically selected for and allocated to the VNF, implementing virtualized management on the hardware acceleration device, and improving resource utilization.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for implementing acceleration processing on a virtualized network function (VNF), the method comprising:
    receiving, by an apparatus, an acceleration request of performing acceleration processing on the VNF, wherein the acceleration request carries a service type of a service to be processed by the VNF and acceleration resource information needed by the VNF;
    determining, by the apparatus, a hardware acceleration device capable of performing acceleration processing on the VNF based on the service type of the service to be processed by the VNF and the acceleration resource information needed by the VNF by:
        querying a first entry to determine a resource description corresponding to the acceleration resource information needed by the VNF based on the service type; and
        querying a second entry to select the hardware acceleration device from a plurality of hardware acceleration devices that satisfy the resource description; and
    allocating, by the apparatus, the selected hardware acceleration device for processing the VNF, wherein the selected hardware acceleration device processes the VNF.

2. The method according to claim 1, wherein querying the first entry to determine the resource description corresponding to the acceleration resource information needed by the VNF based on the service type comprises:
    determining, by the apparatus, a hardware acceleration device type based on the service type; and
    querying the first entry to determine the resource description of the plurality of hardware acceleration devices corresponding to the determined hardware acceleration device type and the acceleration resource information needed by the VNF, wherein the first entry comprises the determined hardware acceleration device type, the acceleration resource information needed by the VNF, and the resource description.

3. The method according to claim 1, wherein querying the second entry to select the hardware acceleration device from the plurality of hardware acceleration devices that satisfy the resource description comprises:
  querying the second entry to select the hardware acceleration device based on at least one type of the following information that is stored in the second entry and that corresponds to the plurality of hardware acceleration devices: resource utilization, location information, or access manners.

4. The method according to claim 1, wherein allocating the selected hardware acceleration device for the VNF comprises:
  sending, by the apparatus, a response message to a virtualized network function manager (VNFM) in response to the acceleration request, wherein the response message comprises attribute information of the selected hardware acceleration device, and the attribute information is used for invoking the VNF and the selected hardware acceleration device.

5. The method according to claim 1, wherein allocating the selected hardware acceleration device for the VNF comprises:
  sending, by the apparatus, a response message to a management platform orchestrator in response to the acceleration request, wherein the response message comprises attribute information of the selected hardware acceleration device, and wherein the attribute information is used for invoking the VNF and the selected hardware acceleration device.

6. A method for implementing acceleration processing on a virtualized network function (VNF), the method comprising:
  receiving, by an apparatus, an acceleration request of performing acceleration processing on the VNF, wherein the acceleration request carries a service type of a service to be processed by the VNF and acceleration resource information needed by the VNF;
  determining, by the apparatus, a hardware acceleration device type for performing acceleration processing on the VNF based on the service type;
  determining, by the apparatus, an acceleration resource needed for the determined hardware acceleration device type based on the acceleration resource information that is needed by the VNF and that is carried in the acceleration request;
  determining, by the apparatus, based on hardware resource information of different hardware acceleration devices, the hardware acceleration device satisfies the acceleration resource needed for the determined hardware acceleration device type, and the hardware acceleration device is capable of performing acceleration processing on the VNF; and
  allocating, by the apparatus, the determined hardware acceleration device for processing the VNF, wherein the determined hardware acceleration device processes the VNF.

7. The method according to claim 6, wherein allocating the determined hardware acceleration device for the VNF comprises:
  sending, by the apparatus, a response message to a virtualized network function manager (VNFM) in response to the acceleration request, wherein the response message comprises attribute information of the determined hardware acceleration device, and the attribute information is used for invoking the VNF and the determined hardware acceleration device.

8. An apparatus for implementing acceleration processing on a virtualized network function (VNF), comprising:
  a transceiver;
  a processor;
  a non-transitory memory storing a program to be executed in the processor, the program comprising instructions that cause the processor to:
    receive, by using the transceiver, an acceleration request of performing acceleration processing on a virtualized network function (VNF), wherein the acceleration request carries a service type of a service to be processed by the VNF and acceleration resource information needed by the VNF;
    determine a hardware acceleration device capable of performing acceleration processing on the VNF based on the service type of the service to be processed by the VNF and the acceleration resource information needed by the VNF by:
      querying a first entry to determine a resource description corresponding to the acceleration resource information needed by the VNF based on the service type; and
      querying a second entry to select the hardware acceleration device from a plurality of hardware acceleration devices that satisfy the resource description; and
    allocate the selected hardware acceleration device for processing the VNF, wherein the selected hardware acceleration device processes the VNF.

9. The apparatus according to claim 8, wherein the program comprises instructions that cause the processor to:
  determine a hardware acceleration device type based on the service type; and
  query the first entry to determine the resource description of the plurality of hardware acceleration devices corresponding to the determined hardware acceleration device type and the acceleration resource information needed by the VNF, wherein the first entry comprises the determined hardware acceleration device type, the acceleration resource information needed by the VNF and the resource description.

10. The apparatus according to claim 8, wherein the program comprises instructions that cause the processor to:
  query the second entry to select the hardware acceleration device based on at least one type of the following information that is stored in the second entry and that corresponds to the plurality of hardware acceleration devices: resource utilization, location information, or access manners.

11. The apparatus according to claim 8, wherein the program comprises further instructions that cause the processor to:
  send a response message to a virtualized network function manager (VNFM) in response to the acceleration request, wherein the response message comprises attribute information of the selected hardware acceleration device, and the attribute information is used for invoking the VNF and the selected hardware acceleration device.

12. The apparatus according to claim 8, wherein the program comprises further instructions that cause the processor to send a response message to a management platform orchestrator in response to the acceleration request, wherein the response message comprises attribute information of the selected hardware acceleration device, and wherein the attribute information is used for invoking the VNF and the selected hardware acceleration device.

13. An apparatus for implementing acceleration processing on a virtualized network function (VNF) comprising:
 a transceiver;
 a processor;
 a non-transitory memory storing a program to be executed in the processor, the program comprising instructions that cause the processor to:
  receive, by using the transceiver, an acceleration request of performing acceleration processing on a virtualized network function (VNF), wherein the acceleration request carries a service type of a service to be processed by the VNF and acceleration resource information needed by the VNF;
  determine a hardware acceleration device type for performing acceleration processing on the VNF based on the service type;
  determine an acceleration resource needed for the determined hardware acceleration device type based on the acceleration resource information that is needed by the VNF and that is carried in the acceleration request;
  determine, based on hardware resource information of different hardware acceleration devices, the hardware acceleration device satisfies the acceleration resource needed for the determined hardware acceleration device type, and the hardware acceleration device is capable of performing acceleration processing on the VNF; and
  allocate the determined hardware acceleration device for processing the VNF, wherein the determined hardware acceleration device processes the VNF.

14. The apparatus according to claim 13, wherein the program comprises instructions that cause the processor to:
 send a response message to a virtualized network function manager (VNFM) in response to the acceleration request, wherein the response message comprises attribute information of the determined hardware acceleration device, and the attribute information is used for invoking the VNF and the determined hardware acceleration device.

15. A non-transitory computer readable medium storing instructions that, when executed by a processor, cause the process to perform the following:
 receiving an acceleration request of performing acceleration processing on a virtualized network function (VNF), wherein the acceleration request carries a service type of a service to be processed by the VNF and acceleration resource information needed by the VNF;
 determining a hardware acceleration device capable of performing acceleration processing on the VNF based on the service type of the service to be processed by the VNF and the acceleration resource information needed by the VNF by:
  querying a first entry to determine a resource description corresponding to the acceleration resource information needed by the VNF based on the service type; and
  querying a second entry to select the hardware acceleration device from a plurality of hardware acceleration devices that satisfy the resource description; and
 allocating the selected hardware acceleration device for processing the VNF, wherein the selected hardware acceleration device processes the VNF.

16. The non-transitory computer readable medium according to claim 15, wherein querying the first entry to determine the resource description corresponding to the acceleration resource information needed by the VNF based on the service type comprises:
 determining a hardware acceleration device type based on the service type; and
 querying the first entry to determine the resource description of the plurality of hardware acceleration devices corresponding to the determined hardware acceleration device type and the acceleration resource information needed by the VNF, wherein the first entry comprises the determined hardware acceleration device type, the acceleration resource information needed by the VNF and the resource description.

17. The non-transitory computer readable medium according to claim 15, wherein querying the second entry to select the hardware acceleration device from the plurality of hardware acceleration devices that satisfy the resource description comprises:
 querying the second entry to select the hardware acceleration device based on at least one type of the following information that is stored in the second entry and that corresponds to the plurality of hardware acceleration devices: resource utilization, location information, or access manners.

18. The non-transitory computer readable medium according to claim 15, wherein allocating the selected hardware acceleration device for the VNF comprises:
 sending a response message to a virtualized network function manager (VNFM) in response to the acceleration request, wherein the response message comprises attribute information of the selected hardware acceleration device, and the attribute information is used for invoking the VNF and the selected hardware acceleration device.

19. The non-transitory computer readable medium according to claim 15, wherein allocating the selected hardware acceleration device for the VNF comprises:
 sending a response message to a management platform orchestrator in response to the acceleration request, wherein the response message comprises attribute information of the selected hardware acceleration device, and wherein the attribute information is used for invoking the VNF and the selected hardware acceleration device.

20. A non-transitory computer readable medium storing instructions that, when executed by a processor, cause the processor to perform the following:
 receiving an acceleration request of performing acceleration processing on a virtualized network function (VNF), wherein the acceleration request carries a service type of a service to be processed by the VNF and acceleration resource information needed by the VNF;
 determining a hardware acceleration device type for performing acceleration processing on the VNF based on the service type;
 determining an acceleration resource needed for the determined hardware acceleration device type based on the acceleration resource information that is needed by the VNF and that is carried in the acceleration request;
 determining, based on hardware resource information of different hardware acceleration devices, the hardware acceleration device satisfies the acceleration resource needed for the determined hardware acceleration device type, and the hardware acceleration device is capable of performing acceleration processing on the VNF; and allocating the determined hardware acceleration device for processing the VNF, wherein the determined hardware acceleration device processes the VNF.

21. The non-transitory computer readable medium according to claim 20, wherein allocating the determined hardware acceleration device for the VNF comprises:

sending a response message to a virtualized network function manager (VNFM) in response to the acceleration request, wherein the response message comprises attribute information of the determined hardware acceleration device, and the attribute information is used for invoking the VNF and the determined hardware acceleration device.

* * * * *